United States Patent
Park et al.

(10) Patent No.: US 10,395,840 B1
(45) Date of Patent: Aug. 27, 2019

(54) MULTILAYER CERAMIC ELECTRONIC COMPONENT

(71) Applicant: Samsung Electro-Mechanics Co., Ltd., Suwon-si, Gyeonggi-do (KR)

(72) Inventors: Chae Min Park, Suwon-si (KR); Ki Won Kim, Suwon-si (KR); Ji Hee Moon, Suwon-si (KR); Dong Hwi Shin, Suwon-si (KR); Sang Soo Park, Suwon-si (KR); Woo Chul Shin, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/257,642

(22) Filed: Jan. 25, 2019

(30) Foreign Application Priority Data

Nov. 16, 2018  (KR) .................. 10-2018-0141420

(51) Int. Cl.
| | |
|---|---|
| B32B 15/08 | (2006.01) |
| H01G 4/30 | (2006.01) |
| H01G 2/06 | (2006.01) |
| H01G 4/008 | (2006.01) |
| H01G 4/12 | (2006.01) |
| H01G 4/14 | (2006.01) |

(52) U.S. Cl.
CPC .............. *H01G 4/30* (2013.01); *H01G 2/065* (2013.01); *H01G 4/008* (2013.01); *H01G 4/1227* (2013.01)

(58) Field of Classification Search
None
See application file for complete search history.

(56) References Cited

U.S. PATENT DOCUMENTS

| | | | |
|---|---|---|---|
| 6,171,644 B1 * | 1/2001 | Jinno ................... | H01C 1/034 29/25.41 |
| 2009/0040688 A1 | 2/2009 | Kayatani | |
| 2011/0193448 A1 | 8/2011 | Saruban et al. | |
| 2014/0085767 A1 * | 3/2014 | Kang ..................... | H01G 4/12 361/301.4 |

FOREIGN PATENT DOCUMENTS

| | | |
|---|---|---|
| JP | 2001-044069 A | 2/2001 |
| KR | 10-1141327 B1 | 5/2012 |
| WO | 2008/001542 A1 | 3/2008 |

* cited by examiner

*Primary Examiner* — Seth Dumbris
(74) *Attorney, Agent, or Firm* — Morgan, Lewis & Bockius LLP

(57) ABSTRACT

A multilayer ceramic electronic component includes a ceramic body including dielectric layers and first and second internal electrodes alternately laminated with respective dielectric layers disposed therebetween, first and second external electrodes disposed on first and second external surfaces of the ceramic body, respectively, the first and second external electrodes each including first and second base electrode layers having at least a portion in contact with first and second external surfaces of the ceramic body, respectively, and first and second plating layers disposed to cover the first and second base electrode layers, respectively, and a water repellent layer disposed to cover both external side surfaces of the first and second plating layers and a surface of the ceramic body.

14 Claims, 5 Drawing Sheets

MULTILAYER CERAMIC ELECTRONIC COMPONENT

CROSS-REFERENCE TO RELATED APPLICATION(S)

This application claims the benefit of priority to Korean Patent Application No. 10-2018-0141420 filed on Nov. 16, 2018 in the Korean Intellectual Property Office, the disclosure of which is incorporated herein by reference in its entirety.

TECHNICAL FIELD

The present disclosure relates to a multilayer ceramic electronic component.

BACKGROUND

Multilayer ceramic electronic components are widely used as IT components in computers, PDAs, mobile phones, and the like, due to advantages thereof such as compactness, guaranteed high capacitance, and ease of mountability. Also, such multilayer ceramic electronic components are widely used as electric components due to high reliability and high strength characteristics thereof.

To suppress the occurrence of defects, in the case of a multilayer ceramic electronic component, internal permeation of surrounding humidity during use thereof or internal permeation of humidity/plating liquid during manufacturing thereof needs to be taken into consideration.

SUMMARY

An aspect of the present disclosure is to provide a multilayer ceramic electronic component in which water repellency performance is concentrated on a portion, vulnerable to humidity permeation, to improve an overall water repellency effect.

According to an aspect of the present disclosure, a multilayer ceramic electronic component includes a ceramic body including dielectric layers and first and second internal electrodes alternately laminated in a stacking direction with the dielectric layers disposed therebetween, the first and second internal electrodes respectively being exposed to first and second external surfaces of the ceramic body in a length direction perpendicular to the stacking direction; first and second external electrodes disposed on the first and second external surfaces of the ceramic body to be electrically connected to the first and second internal electrodes, respectively, the first and second external electrodes each including first and second base electrode layers having at least a portion in contact with first and second external surfaces of the ceramic body, respectively, and first and second plating layers covering the first and second base electrode layers, respectively; and a water repellent layer including a first portion covering external surfaces of the first and second plating layers and a second portion covering at least one surface of the ceramic body. The water repellent layer further includes a third portion covering gaps between the ceramic body and the first and second plating layers. Arcsin (Pa/Pc), which is an angle of an inclined surface of the third portion with respect to the at least one surface of the ceramic body covered by the second portion, is 30 degrees or more and 60 degrees or less, where a minimum distance from a corner edge, at which the first and second plating layers and the at least one surface of the ceramic body intersect, to the inclined surface of the third portion is denoted by "Pa", and a minimum distance from the corner edge to an intersection portion between the inclined surface of the third portion and the second portion covering the at least one surface of the ceramic body is denoted by "Pc".

According to another aspect of the present disclosure, a multilayer ceramic electronic component includes a ceramic body including dielectric layers and first and second internal electrodes alternately laminated in a stacking direction with the dielectric layers disposed therebetween, the first and second internal electrodes respectively being exposed to first and second external surfaces of the ceramic body in a length direction perpendicular to the stacking direction; first and second external electrodes disposed on the first and second external surfaces of the ceramic body to be electrically connected to the first and second internal electrodes, respectively, the first and second external electrodes each including first and second base electrode layers having at least a portion in contact with first and second external surfaces of the ceramic body, respectively, and first and second plating layers covering the first and second base electrode layers, respectively; and a water repellent layer including a first portion covering external surfaces of the first and second plating layers and a second portion covering at least one surface of the ceramic body. The water repellent layer further includes a third portion covering gaps between the ceramic body and the first and second plating layers. Arcsin (Pa/Pc), which is an angle of an inclined surface of the third portion with respect to the at least one surface of the ceramic body covered by the second portion, is 30 degrees or more and 60 degrees or less, where a minimum distance from a corner edge, at which the first and second plating layers and the at least one surface of the ceramic body intersect, to the inclined surface of the third portion is denoted by "Pa", and a minimum distance from the corner edge to an intersection portion between the inclined surface of the third portion and the second portion covering the at least one surface of the ceramic body is denoted by "Pc". The ceramic body and the first and second external electrodes are mounted on first and second electrode pads that are disposed on a board.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
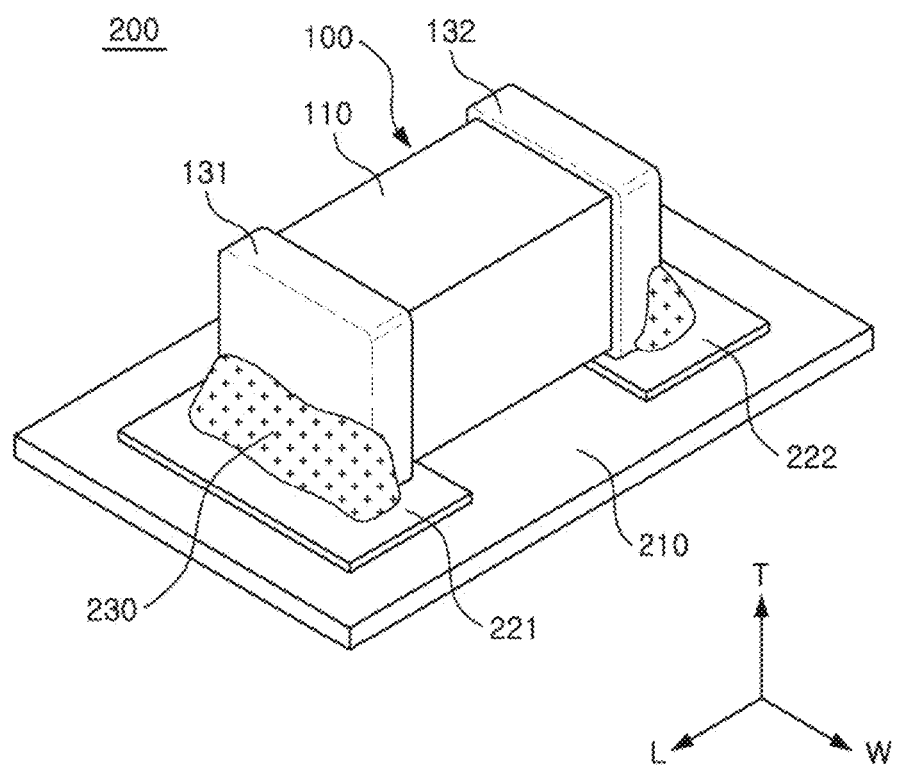
FIG. 1 is a perspective view illustrating a multilayer ceramic electronic component and a mounting form thereof according to an exemplary embodiment in the present disclosure.

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Through the specification, in addition, unless explicitly described to the contrary, the word "comprise" and variations such as "comprises" or "comprising," will be understood to imply the inclusion of stated elements but not the exclusion of any other elements.

Directions of a hexahedral ceramic body will be defined in order to clearly describe an embodiment of the invention. L, W and T shown throughout the drawings refer to a length direction, a width direction, and a thickness direction, respectively. Here, the thickness direction may be the same as a direction in which dielectric layers are laminated (a stacking direction).

Hereinafter, a multilayer ceramic electronic component according to an exemplary embodiment in the present disclosure will be described. In detail, a multilayer ceramic capacitor will be described. However, the present disclosure is not limited thereto.

FIG. 1 is a perspective view illustrating a multilayer ceramic electronic component and a mounting from thereof according to an exemplary embodiment in the present disclosure.

Referring to FIG. 1, a multilayer ceramic electronic component 100 may include a ceramic body 110 and first and second external electrodes 131 and 132, and may be mounted (200) on first and second electrode pads 221 and 222 on a board 210.

The ceramic body 110 may be formed as a hexahedron having two side surfaces in a length direction L, two side surfaces in a width direction W, and two side surfaces in a thickness direction T. The ceramic body 110 may be formed by laminating a plurality of dielectric layers 111 in the thickness direction T and then sintering the plurality of dielectric layers 111. Shapes and dimensions of the ceramic body 110 and the number of laminated dielectric layers 111 (one or more) are not limited to those of an example illustrated in the exemplary embodiment.

The plurality of dielectric layers 111 disposed in the ceramic body 110 may be in a sintered state, and adjacent dielectric layers 111 may be integrated with each other so that boundaries therebetween are not readily apparent without using a scanning electron microscope (SEM).

A thickness of the dielectric layer 111 may be arbitrarily changed in accordance with a capacitance design of the multilayer ceramic electronic component 100, and the dielectric layer 111 may contain ceramic powder particles having a high dielectric constant, such as barium titanate ($BaTiO_3$)-based powder particles or strontium titanate ($SrTiO_3$)-based powder particles. However, a material thereof is not limited thereto. Further, various ceramic additives, organic solvents, plasticizers, binders, dispersing agents, and the like, may be added to the ceramic powder particles, according to the object of the present disclosure.

An average particle size of a ceramic powder used to form the dielectric layer 111 is not limited and may be controlled to achieve the object of the present disclosure. For example, the average particle size may be controlled to be 400 nanometers (nm) or less. Accordingly, the multilayer ceramic electronic component 100 according to an exemplary embodiment may be used as a component requiring a large size and high capacitance as in the case of IT components.

For example, the dielectric layer 111 may be formed by applying slurry containing a powder such as a barium titanate ($BaTiO_3$)-based powder to carrier films and drying the applied slurry to prepare a plurality of ceramic sheets. The ceramic sheet may be manufactured by mixing the ceramic powder, a binder, and a solvent to prepare the slurry and manufacturing the prepared slurry in a sheet shape having a thickness of several micrometers (μm) by a doctor blade method, but the manufacturing method of the ceramic sheet is not limited thereto.

The first and second external electrodes 131 and 132 may be disposed on first and second external surfaces (for example, one external surface and the other external surfaces in the length direction) of the ceramic body 110 to be connected to first and second internal electrodes, respectively. Also the first and second external electrodes 131 and 132 may be configured to electrically connect the first and second internal electrodes to a board.

For example, the first and second external electrodes 131 and 132 may be formed of one of copper (Cu), palladium (Pd), platinum (Pt), gold (Au), silver (Ag), and lead (Pb), or alloys thereof.

The first and second external electrodes 131 and 132 may be electrically connected to the first and second electrode pads 221 and 222 through first and second solders 230, respectively. For example, the first and second solders 230 may be more closely connected to the first and second external electrodes 131 and 132 according to a reflow process.

Figure 2:
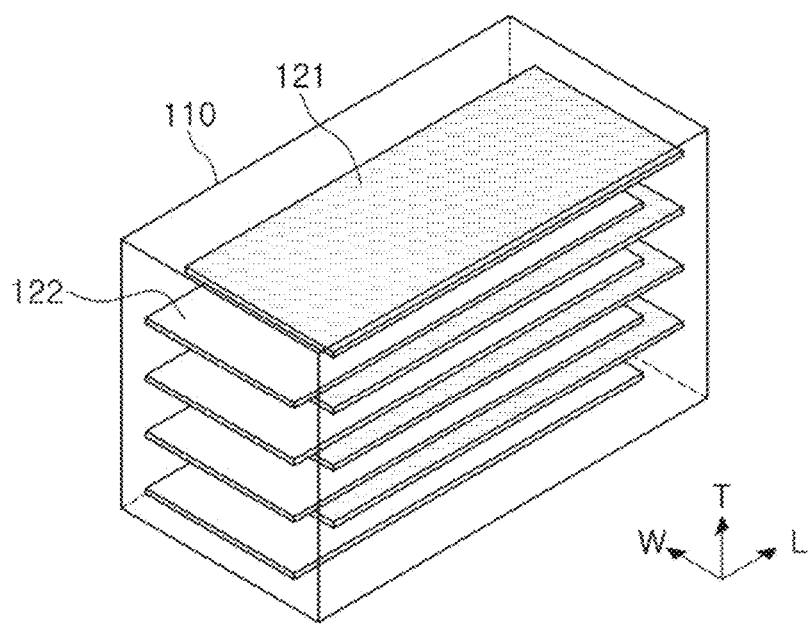
FIG. 2 is a perspective view illustrating a shape of an internal electrode of a multilayer ceramic electronic component according to an exemplary embodiment in the present disclosure.

FIG. 2 is a perspective view illustrating a shape of an internal electrode of a multilayer ceramic electronic component according to an exemplary embodiment in the present disclosure.

Referring to FIG. 2, a ceramic body includes first and second internal electrodes 121 and 122, and a plurality of dielectric layers. The first and second internal electrodes 121 and 122 are alternately laminated with respective dielectric layers disposed therebetween to be exposed to a first external surface and a second external surface of the ceramic body 110 (for example, one external surface and the other external surface of the ceramic body 110 in the length direction) to have polarities opposite to each other.

The first internal electrodes 121 and the second internal electrodes 122 may be formed in a laminating direction of the dielectric layers to be alternately exposed to one external surface and the other external surface of the ceramic body 110 in the length direction L of the ceramic body 110 by printing a conductive paste containing a conductive metal thereon. The first internal electrodes 121 and the second internal electrodes 122 may be electrically insulated from each other by respective dielectric layers disposed therebetween.

For example, the first and second internal electrodes 121 and 122 may be electrically connected to the first and second external electrodes 131 and 132 disposed on both external surfaces of the ceramic body 110 in the length direction L of the ceramic body 110 through portions alternately exposed to both external surfaces of the ceramic body 110 in the length direction L of the ceramic body 110, respectively.

For example, the first and second internal electrodes 121 and 122 by formed by a conductive paste for an internal electrode having an average particle size of 0.1 to 0.2 μm and containing 40 wt % to 50 wt % of conductive metal powder particles, but the conductive paste thereof is not limited thereto.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode pattern is printed may be laminated, pressed, and sintered to manufacture the ceramic body 110.

Accordingly, when a voltage is applied to the first and second eternal electrodes 131 and 132 opposing each other, charges are accumulated between the first and second internal electrodes 121 and 122. In this case, capacitance of the multilayer ceramic electronic component 100 is in proportion to an area of a region in which the first and second internal electrodes 121 and 122 overlap each other.

For example, when the overlapping area of the first and second internal electrodes 121 and 122 is significantly increased, capacitance of even a capacitor having the same size may be significantly increased.

Thicknesses of the first and second internal electrodes 121 and 122 may be determined depending on intended usage thereof. For example, each of the thicknesses of the first and second internal electrodes 121 and 122 may be 0.4 μm or less. In addition, the number of the first and second internal electrodes 121 and 122 laminated may be 400 or more. Thus, the multilayer ceramic electronic component 100 may be used as an IT component requiring compactness and high capacitance.

Since a thickness of a dielectric layer corresponds to a distance between the first and second internal electrodes 121 and 122, the capacitance of the multilayer ceramic electronic component 100 may be increased as the thickness of the dielectric layer is decreased.

The first and second internal electrodes 121 and 122 may be formed of one of nickel (Ni), copper (Cu), palladium (Pd), silver (Ag), lead (Pb), and platinum (Pt), or alloys thereof, but a material thereof is not limited thereto.

Withstand voltage characteristics of the ceramic body 110 may be improved as the distance between the first and second internal electrodes 121 and 122 is increased.

In the case in which the multilayer ceramic electronic component 100 is required to have withstand voltage characteristics that are as high as those of an electric component, the multilayer ceramic electronic component 100 may be designed in such a manner that an average thickness of dielectric layers may exceed twice an average thickness of the first and second internal electrodes 121 and 122. Accordingly, the multilayer ceramic electronic component 100 may have high withstand voltage characteristics to be used as an electric component.

Durability (for example, flexural strength) of the ceramic body 110 may have improved reliability when a width of the ceramic body 110 exceeds 0.5 times a thickness thereof.

Figure 3A:
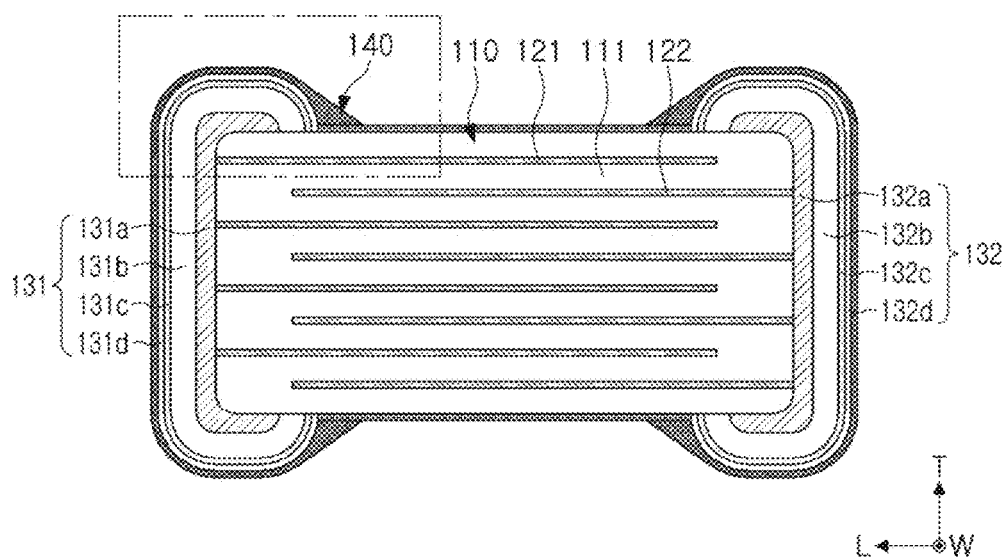
FIG. 3A is a side view illustrating a cross section of a multilayer ceramic electronic component according to an exemplary embodiment in the present disclosure.

FIG. 3A is a side view illustrating a cross section of a multilayer ceramic electronic component according to an exemplary embodiment in the present disclosure.

Referring to FIG. 3A, first and second external electrodes 131 and 132 may include first and second base electrode layers 131a and 132, each having at least a portion in contact with first and second external surfaces (for example, one external surface and the other external surface of the ceramic body 110 in a length direction), first and second conductive resin layers 131b and 132b disposed to cover the first and second base electrode layers 131a and 132a, and first and second plating layers 131c and 132c disposed to cover the first and second conductive resin layers 131b and 132b, respectively, and may extend along a surface of the ceramic body 110 in the length direction, respectively.

For example, the first and second base electrode layers 131a and 132a may contain the most the same metal component as a metal component (for example, copper (Cu), nickel (Ni), or the like) contained most in the internal electrodes 121 and 122 and may be formed using sintering. Accordingly, since the first and second base electrode layers 131a and 132a may be relatively easily bonded to the first and second internal electrodes 121 and 122, currents of the first and second internal electrodes 121 and 122 may be collected efficiently (for example, low contact resistance).

The first and second base electrode layers 131a and 132a may be formed by dipping into a paste containing a metal component or printing a conductive paste containing a conductive metal on at least one surface of the ceramic body 110 in a thickness direction T. Alternatively, the first and second base electrode layers 131a and 132a may be formed by a sheet transfer method or a pad transfer method, but a forming method thereof is not limited thereto.

Each of the first and second base electrode layers 131a and 132a may extend along a surface of the ceramic body 110 in a length direction. Since a metal component contained in the first and second base electrode layers 131a and 132a has greater strength than a typical ceramic component, the multilayer ceramic electronic component may have improved strength by further concentrating rigidity near a surface in accordance with the extension of the first and second base electrodes 131a and 132a in the length direction.

The first and second plating layers 131c and 132c may improve at least some of structural reliability, ease of board mounting, resistance to the outside, heat resistance, and equivalent series resistance (ESR), and may be formed using sputtering or electric deposition, but a forming method thereof is not limited thereto.

The first and second external electrodes 131 and 132 may include third and fourth plating layers 131d and 132d disposed to cover the first and second plating layers 131c and 132c, respectively. The third and fourth plating layers 131d and 132d may contain the most tin (Sn), and the first and second plating layers 131c and 132c may contain the most nickel (Ni). In the case in which the third and fourth plating layers 131d and 132d are included in the first and second external electrodes 131 and 132, the first and second plating layers 131c and 132c may be omitted depending on a design.

Since the first and second conductive resin layers 131b and 132b may have higher flexibility than the first and second plating layers 131c and 132c, they may protect the multilayer ceramic electronic component 10 from an external physical impact or a bending impact of the multilayer ceramic electronic component 100. In addition, the first and second conductive resin layers 131b and 132b may absorb tensile stress or stress applied during board mounting to prevent cracking from occurring in an external electrode.

For example, the first and second conductive resin layers 131b and 132b may have a structure, in which a conductive particle such as copper (Cu), nickel (Ni), palladium (Pd), platinum (Pt), gold (Au), silver (Ag), lead (Pb), or the like is contained in a glass or a highly-flexible resin such as epoxy, to have high flexibility and high conductivity.

Each of the first and second conductive resin layers 131b and 132b may extend in the length direction in such a manner that a portion thereof is in contact with a surface of the ceramic body 110. Accordingly, the multilayer ceramic electronic component may further enhance impact absorption performance of the first and second conductive resin layers 131b and 132b on the surface of the ceramic body 110.

A thickness of each of the first and second conductive resin layers 131b and 132b on the ceramic body 110 in a thickness direction may be smaller than a thickness of each of the first and second base electrode layers 131a and 132a on the ceramic body 110 in a thickness direction. Accordingly, the multilayer ceramic electronic component may more efficiently absorb external impact as well as stress generated during mounting and sintering of a board, and may more efficiently attenuate acoustic noise which may occur in the ceramic body 110.

The thickness of each of the first and second external electrodes 131 and 132 on the ceramic body 110 in the thickness direction may be greater than a thickness in a typical case. In general, gaps between the first and second external electrodes 131 and 132 and the ceramic body 110 may become relatively vulnerable to humidity permeation with an increase in the thickness of each of the first and second external electrodes 131 and 132 on the ceramic body 110 in the thickness direction.

The multilayer ceramic electronic component includes a water repellent layer 140 which may further concentrate water repellency performance on a portion vulnerable to humidity permeation, in response to various thicknesses of each of the first and second external electrodes 131 and 132 in the thickness direction, to improve overall water repellency efficiency.

Figure 3B:
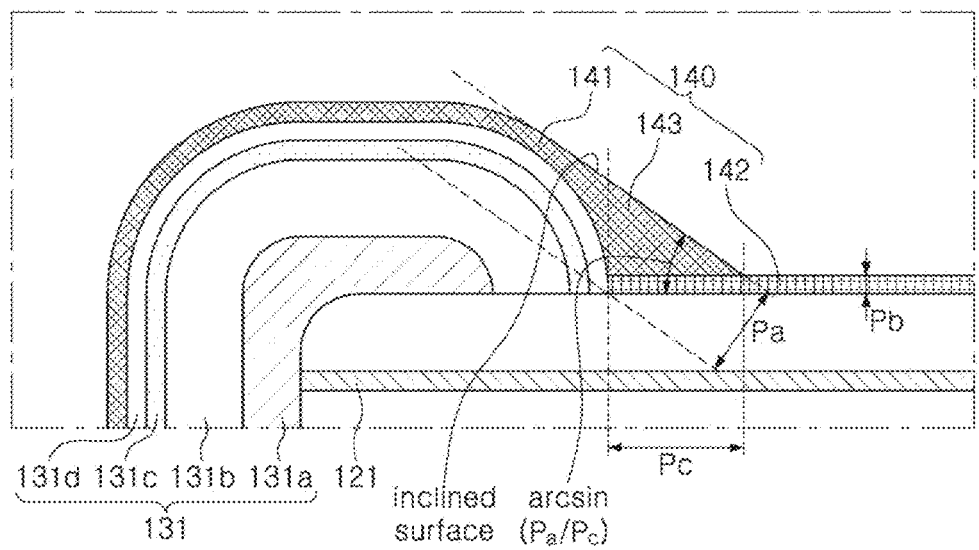
FIG. 3B is an enlarged side view of a water repellent layer of a multilayer ceramic electronic component according to an exemplary embodiment in the present disclosure.
Figure 4:
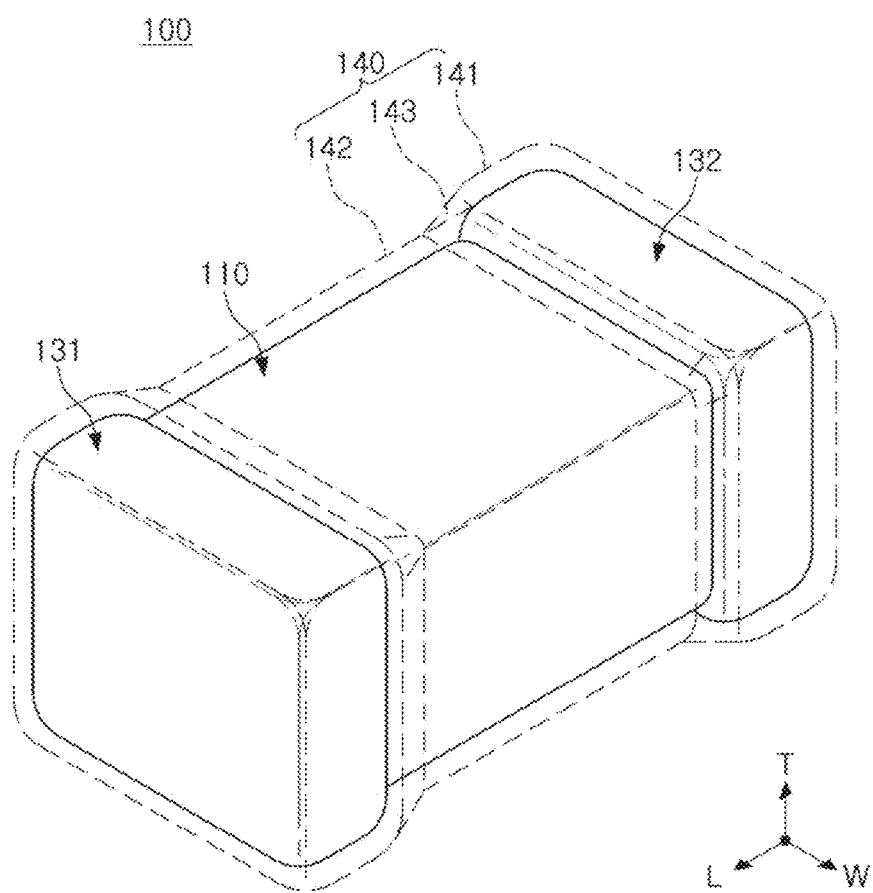
FIG. 4 is a perspective view illustrating a shape of a water repellent layer according to an exemplary embodiment in the present disclosure.

FIG. 3B is an enlarged side view of a water repellent layer of a multilayer ceramic electronic component according to an exemplary embodiment in the present disclosure, and FIG. 4 is a perspective view illustrating a shape of a water repellent layer according to an exemplary embodiment in the present disclosure.

Referring to FIGS. 3B and 4, the multilayer ceramic electronic component according to an exemplary embodiment may further include a water repellent layer 140 disposed to cover both external side surfaces of the first and second plating layers 131c and 132c and the surface of the ceramic body 110.

For example, the water repellent layer 140 may include silicon (Si)-containing organic/inorganic compound to improve humidity resistance reliability, and may include fluorine (F)-containing organic/inorganic and polymeric components. The water repellent layer 140 may be implemented using silane coupling agent, silicone-resin, or the like, but is not limited thereto as long as it has only a water repellency function.

The water repellent layer 140 may include a portion 143 disposed to cover gaps between the first and second external electrodes 131 and 132 and the ceramic body 110, a portion 142 disposed to cover the surface of the ceramic body 110, and a portion 141 disposed to cover the first and second external electrodes 131 and 132.

The portion 143, disposed to cover the gap between the first or second external electrode 131 or 132 and the ceramic body 110, has a first thickness Pa, and the portion 142, disposed to cover the surface of the ceramic body 110, has a second thickness Pb. A length from a portion, at which an external side surface of the water repellent layer 140 is parallel to the length direction, to the gap in the length direction is Pc.

A direction of the first thickness Pa is perpendicular to a diagonal line extending from the portion, at which an external side surface of the water repellent layer 140 is parallel to the length direction, to one point of an external side surface of the portion 141 disposed to cover the first and second external electrodes 131 and 132. For example, the diagonal line, the first thickness Pa, and the length Pc from the portion, at which an external side surface of the water repellent layer 140 is parallel to the length direction, to the gap in the length may form a right triangle.

The water repellent layer 140 of the multilayer ceramic electronic component may be configured in such a manner that a water repellency function is relatively concentrated on the gap, between the first and second external electrodes 131 and 132 and the ceramic body 110, relatively vulnerable to humidity permeation.

A portion of the portion 143, disposed to cover the gas between the first and second external electrodes 131 and 132 and the ceramic body 110, may be firstly disposed.

Then, the other portions of the portion 143, disposed to cover the gap between the first and second external electrodes 131 and 132 and the ceramic body 110, may be integrated with the portion 141, disposed to cover the first and second external electrodes 131 and 132, and the portion 142, disposed to cover the surface of the ceramic body 110, to have a uniform thickness.

Accordingly, since the firstly disposed portion of the water repellent layer 140 may be pressed by a subsequently disposed portion in a direction toward the gap, the gap may be filled more densely. As a result, the multilayer ceramic electronic component may more efficiently concentrate the water repellency performance on a gap relatively vulnerable to humidity permeation.

The direction, in which the firstly disposed portion is pressed by the subsequently disposed portion of the water repellent layer 140, may be optimized by Table (1), Table (2), and Table (3).

Table (1) was created by organizing Pc values, depending on each length L of the ceramic body 110 in a length direction, when water repellency performance of the portion 143 disposed to cover the gap between the first and second external electrodes 131 and 132 and the ceramic body 110 is higher than or equal to reference water repellency performance. Pc may be 5.54 µm or more to 58.06 µm or less, and L may be 1.0 mm or more to 3.2 mm or less, but Pc and L are not limited thereto. The water repellency performance was obtained by measuring whether performance of a multilayer ceramic electronic component (for example, internal resistance, insulation performance, and the like) was greater than reference performance when the performance of a multilayer ceramic electronic component was measured after 15 hours have passed, while applying a voltage of 75 V, at a temperature of 85 degrees and a humidity of 85%.

TABLE (1)

|  | L (mm) | | | |
| --- | --- | --- | --- | --- |
|  | 1.0 | 1.6 | 2.0 | 3.2 |
| Sample 1 | 7.39 | 13.87 | 11.94 | 40.65 |
| Sample 2 | 6.63 | 10.65 | 14.52 | 45.16 |
| Sample 3 | 9.57 | 11.29 | 15.48 | 44.19 |
| Sample 4 | 5.54 | 15.48 | 17.74 | 48.06 |
| Sample 5 | 6.30 | 12.90 | 15.81 | 58.06 |
| Pc Maximum (μm) | 9.57 | 15.48 | 17.74 | 58.06 |
| Pc Minimum (μm) | 5.54 | 10.65 | 11.94 | 40.65 |
| Pc Average (μm) | 7.09 | 12.84 | 15.10 | 47.23 |

Table (2) was created by organizing Pa values, depending on each length L of the ceramic body 110 in a length direction, when water repellency performance of the portion 143 disposed to cover the gap between the first and second external electrodes 131 and 132 and the ceramic body 110 is higher than or equal to reference water repellency performance. Pa may be 3.73 μm or more to 30.71 μm or less, and L may be 1.0 mm or more to 3.2 mm or less, but Pc and L are not limited thereto. The water repellency performance was obtained under the same experimental conditions as those of Table (1).

TABLE (2)

|  | L (mm) | | | |
| --- | --- | --- | --- | --- |
|  | 1.0 | 1.6 | 2.0 | 3.2 |
| Pa Maximum (μm) | 9.38 | 12.65 | 13.37 | 30.71 |
| Pa Minimum (μm) | 5.43 | 5.88 | 6.47 | 20.48 |
| Pa Average (μm) | 6.13 | 8.14 | 9.05 | 24.14 |

Table (3) was created by organizing arcsin function values of the Pa average of Table (1) and the Pc average of Table (2), depending on each length L of the ceramic body 110 in a length direction.

TABLE (3)

|  | L (mm) | | | |
| --- | --- | --- | --- | --- |
|  | 1.0 | 1.6 | 2.0 | 3.2 |
| Arcsin (Pa/Pc) | 60° | 40° | 37° | 30° |

Referring to Table (1) to Table (3), arcsin(Pa/Pc) may be 30 degrees or more to 60 degrees or less. Accordingly, since the firstly disposed portion of the water repellent layer 140 may be pressed by a subsequently disposed portion in a direction toward the gap, the gap may be filled more densely. As a result, the multilayer ceramic electronic component may more efficiently concentrate the water repellency performance on a gap relatively vulnerable to humidity permeation.

Table (4) was created by adding an L value to the arcsin function values as a variable, depending on each length L of the ceramic body 110 in a length direction.

TABLE (4)

|  | L (mm) | | | |
| --- | --- | --- | --- | --- |
|  | 1.0 | 1.6 | 2.0 | 3.2 |
| arcsin (Pa/Pc) * ($L^2$/1.0 mm2) | 60° | 50° | 52° | 55° |

Referring to Table (4), (arcsin(Pa/Pc)*($L^2$/1.0 mm2)) may be 50 degrees or more to 60 degrees or less. Accordingly, since the firstly disposed portion of the water repellent layer 140 may be pressed by a subsequently disposed portion in a direction toward the gap in consideration of the length of the ceramic body 110, the gap may be filled more densely. As a result, the multilayer ceramic electronic component may more efficiently concentrate the water repellency performance on a gap relatively vulnerable to humidity permeation in consideration of the length of the ceramic body 110.

The greater a thickness of the water repellent layer 140, the higher the water repellency performance of the water repellent layer 140. In addition, the smaller the thickness of the water repellent layer 40, the less manufacturing cost and time of the multilayer ceramic electronic component. Accordingly, a second thickness Pb of the water repellent layer 140 may be suitably set.

Force, to press the firstly disposed portion of the water repellent layer 140 by a subsequently disposed portion in a direction toward the gap, may be required more strongly as the first thickness Pa increases. In addition, the greater the second thickness Pb, the stronger the force.

Accordingly, when a ratio of the first thickness Pa to the second ratio Pb is optimized, the multilayer ceramic electronic component may efficiently concentrate water repellency performance of the gap, while variously designing the water repellency performance, in response to various water repellency performances.

Table (5) was created by organizing a Pb value and Pa/Pb values, depending on each length L of the ceramic body 110 in a length direction, when water repellency performance of the portion 143 disposed to cover the gap between the first and second external electrodes 131 and 132 and the ceramic body 110 is higher than or equal to reference water repellency performance. Pb may be 0.1 μm or more to 1.0 μm or less, but is not limited thereto. The water repellency performance was obtained under the same experimental conditions as those in Table (1).

TABLE (5)

|  | L (mm) | | | |
| --- | --- | --- | --- | --- |
|  | 1.0 | 1.6 | 2.0 | 3.2 |
| Pb Maximum (μm) | 1.0 | 1.0 | 1.0 | 1.0 |
| Pb Minimum (μm) | 0.1 | 0.1 | 0.1 | 0.1 |
| Pa/Pb Maximum | 111 | 127 | 134 | 307 |
| Pa/Pb Minimum | 4 | 6 | 6 | 20 |

Referring to Table (2) and Table (5), when Pb has a minimum value, the multilayer ceramic electronic component may have high gap water-repellency performance for all L values of Table (5) when Pa/Pb is 111 or less.

Referring to Table (2) and Table (5), when Pb has a maximum value, the multilayer ceramic electronic component may have high gap water-repellency performance for all L values of Table (5) when Pa/Pb is 20 or more.

Accordingly, the multilayer ceramic electronic component may have high gap water-repellency performance for all L values of Table (5) when Pa/Pb is 20 or more to 111 or less.

Table (6) was created by adding an L value to the Pb value and the Pa/Pb value as a variable, depending on each length L of the ceramic body 110 in a length direction.

TABLE (6)

| | L (mm) | | | |
|---|---|---|---|---|
| | 1.0 | 1.6 | 2.0 | 3.2 |
| Pa/Pb Maximum* (1.0 mm/L) | 111 | 79.375 | 67 | 95.9375 |
| Pa/Pb Minimum* (1.0 mm/L) | 4 | 3.75 | 3 | 6.25 |

Referring to Table (6), when Pb has a minimum value, the multilayer ceramic electronic component may have high gap water-repellency performance for all L values of Table (6) in consideration of the L value when ((Pa/Pb)*(1.0 mm/L)) is 67 or less.

Referring to Table (6), when Pb has a maximum value, the multilayer ceramic electronic component may have high gap water-repellency performance for all L values of Table (6) in consideration of the L value when ((Pa/Pb)*(1.0 mm/L)) is 6.25 or more.

Accordingly, the multilayer ceramic electronic component may have high gap water-repellency performance for all L values of Table (6) in consideration of the L value when ((Pa/Pb)*(1.0 mm/L)) is 6.25 or more to 67 or less.

Figure 5A:
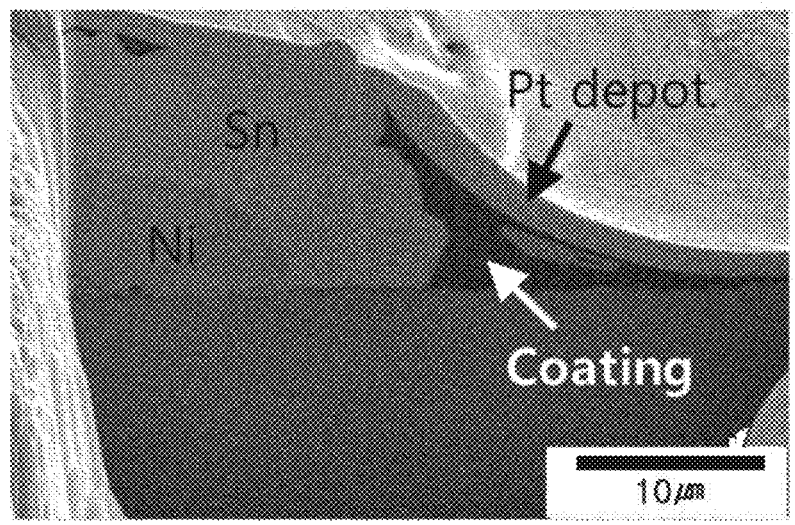
FIG. 5A is a scanning electron microscope (SEM) image illustrating a gap cover of a water repellent layer of a multilayer ceramic electronic component according to an exemplary embodiment in the present disclosure.
Figure 5B:
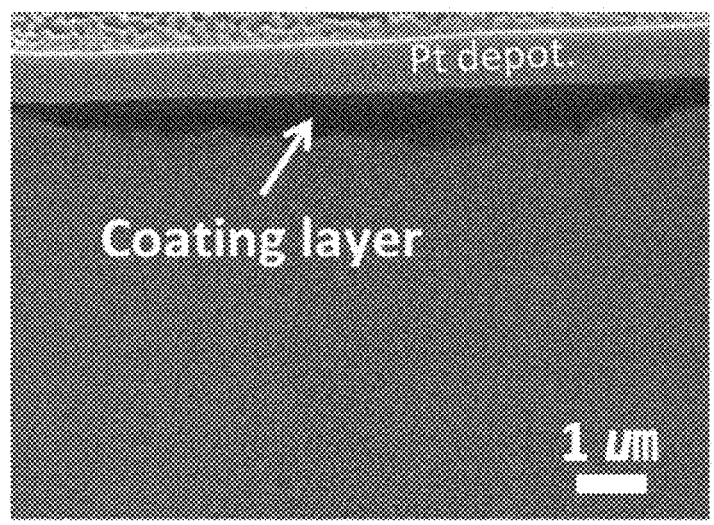
FIG. 5B is an SEM image illustrating a ceramic body cover portion of a water repellent layer of a multilayer ceramic electronic component according to an exemplary embodiment in the present disclosure.

FIG. 5A is a scanning electron microscope (SEM) image illustrating a gap cover of a water repellent layer of a multilayer ceramic electronic component according to an exemplary embodiment in the present disclosure, and FIG. 5B is an SEM image illustrating a ceramic body cover portion of a water repellent layer of a multilayer ceramic electronic component according to an exemplary embodiment in the present disclosure.

Referring to FIGS. 5A and 5B, a water repellent layer may cover first and second plating layers Ni as well as third and fourth plating layers Sn, and a firstly disposed portion Coating of the water repellent layer may be pressed by a subsequently disposed portion Pt depot in a direction toward gap.

Accordingly, the water repellent layer may include a portion disposed to cover a gap between the first and second plating layers Ni and a ceramic body, having higher density as combing closer to the gap.

In addition, the portion of the water repellent layer, disposed to cover a gap between the first and second plating layers Ni and a ceramic body, may have a surface continuous from an internal side surface of a portion disposed to cover a surface of the ceramic body to an internal side surface of a portion disposed to cover external side surfaces of the first and second plating layers.

According to an exemplary embodiment, a multilayer ceramic electronic component may further concentrate water repellency performance on a portion vulnerable to humidity permeation to improve overall water repellency efficiency.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and first and second internal electrodes alternately laminated in a stacking direction with the dielectric layers disposed therebetween, the first and second internal electrodes respectively being exposed to first and second external surfaces of the ceramic body in a length direction perpendicular to the stacking direction;
first and second external electrodes disposed on the first and second external surfaces of the ceramic body to be electrically connected to the first and second internal electrodes, respectively, the first and second external electrodes each including first and second base electrode layers having at least a portion in contact with first and second external surfaces of the ceramic body, respectively, and first and second plating layers covering the first and second base electrode layers, respectively; and
a water repellent layer including a first portion covering external surfaces of the first and second plating layers and a second portion covering at least one surface of the ceramic body,
wherein the water repellent layer further includes a third portion covering gaps between the ceramic body and the first and second plating layers, and
wherein arcsin (Pa/Pc), which is an angle of an inclined surface of the third portion with respect to the at least one surface of the ceramic body covered by the second portion, is 30 degrees or more and 60 degrees or less, where a minimum distance from a corner edge, at which the first and second plating layers and the at least one surface of the ceramic body intersect, to the inclined surface of the third portion is denoted by "Pa", and a minimum distance from the corner edge to an intersection portion between the inclined surface of the third portion and the second portion covering the at least one surface of the ceramic body is denoted by "Pc".

2. The multilayer ceramic electronic component of claim 1, wherein (arcsin(Pa/Pc)*(L²/1.0 mm2)) is 50 degrees or more and 60 degrees or less, where a length of the ceramic body in the length direction is denoted by "L".

3. The multilayer ceramic electronic component of claim 2, wherein Pa is 3.73 μm or more and 30.71 μm or less,
Pc is 5.54 μm or more and 58.06 μm or less, and
L is 1.0 mm or more and 3.2 mm or less.

4. The multilayer ceramic electronic component of claim 1, wherein the first and second external electrodes further comprise first and second conductive resin layers, disposed between the first and second base electrode layers and the first and second plating layers, respectively, and
each of the first and second conductive resin layers has at least a portion extending in the length direction to be in contact with the at least one surface of the ceramic body.

5. The multilayer ceramic electronic component of claim 4, wherein each of the first and second base electrode layers extends along the surface of the ceramic body in a length direction, and
each of the first and second conductive resin layers on the ceramic body in a thickness direction has a thickness greater than a thickness of each of the first and second base electrode layers on the ceramic body in a thickness direction.

6. The multilayer ceramic electronic component of claim 1, wherein Pa/Pb is 20 or more and 111 or less, where a thickness of the second portion of the water repellent layer covering the at least one surface of the ceramic body is denoted by "Pb".

7. The multilayer ceramic electronic component of claim 6, wherein ((Pa/Pb)*(1.0 mm/L)) is 6.25 or more and 67 or less.

8. The multilayer ceramic electronic component of claim 1, wherein the third portion of the water repellent layer covering the gap between the ceramic body and the first and second plating layers has higher density as the third portion comes closer to the gap.

9. The multilayer ceramic electronic component of claim 1, wherein the third portion of the water repellent layer, covering the gap between the ceramic body and the first and second plating layers, has a surface continuous from one end of the second portion of the water repellent portion covering the at least one surface of the ceramic body, to one end of the first portion of the water repellent layer, covering the external surfaces of the first and second plating layers.

10. The multilayer ceramic electronic component of claim 1, wherein a distance between the first and second internal electrodes is twice an average thickness of each of the first and second internal electrodes or more.

11. The multilayer ceramic electronic component of claim 1, wherein the water repellent layer includes silicon (Si)-containing organic/inorganic compound or fluorine (F)-containing organic/inorganic and polymeric components.

12. The multilayer ceramic electronic component of claim 1, wherein the first and second external electrodes include third and fourth plating layers disposed to cover the first and second plating layers, respectively, and
wherein the third plating layer is disposed between the water repellent layer and the first plating layer, and the fourth plating layer is disposed between the water repellent layer and the second plating layer.

13. The multilayer ceramic electronic component of claim 12, wherein the first and second plating layers include nickel (Ni), and the third and fourth plating layers include tin (Sn).

14. A multilayer ceramic electronic component package comprising the multilayer ceramic electronic component of claim 1, wherein the multilayer ceramic electronic component package further comprises first and second electrode pads and a board, and
wherein the ceramic body and the first and second external electrodes of the multilayer ceramic electronic component are mounted on the first and second electrode pads that are disposed on the board.

* * * * *